United States Patent [19]
Balsells

[11] Patent Number: 5,082,390
[45] Date of Patent: Jan. 21, 1992

[54] LATCHING, HOLDING AND LOCKING SPRING APPARATUS

[75] Inventor: Peter J. Balsells, P.O. Box 15092, Santa Ana, Calif. 92705

[73] Assignees: Peter J. Balsells; Joan C. Balsells, Santa Ana, Calif.

[21] Appl. No.: 643,505

[22] Filed: Jan. 22, 1991

[51] Int. Cl.$^5$ .............................. B25G 3/18
[52] U.S. Cl. .................. 403/326; 403/357; 285/318
[58] Field of Search .......... 403/326, 357, DIG. 7; 285/318; 411/352, 353, 348

[56] References Cited

U.S. PATENT DOCUMENTS

| | | | |
|---|---|---|---|
| 3,610,063 | 10/1971 | Hart | 474/94 |
| 4,358,215 | 11/1982 | Rivin | 285/318 X |
| 4,678,210 | 7/1987 | Balsells | 285/318 |

Primary Examiner—Andrew V. Kundrat
Attorney, Agent, or Firm—Walter A. Hackler

[57] ABSTRACT

A locking mechanism is disclosed which includes a garter-type canted-coil spring having elliptical coils with a coil height and a coil width measured, respectively, along a minor and a major axis of the elliptical coils for holding and locking a first and second member to one another. The first member includes a first groove for retaining the spring with the first groove having a depth less than the coil width in order that a portion of each coil extends outwardly from the first groove. The second member includes a second groove for accepting the extended portion of each coil and for loading the coils generally along the major axis thereof, said first and second members being locked to one another when the coils are disposed within and loaded by the first and second grooves.

18 Claims, 3 Drawing Sheets

LATCHING, HOLDING AND LOCKING SPRING APPARATUS

The present invention is generally related to locking mechanisms and is more particularly directed to piston or housing mounted springs having elliptical coils in which the coils are oriented to provide superior holding, latching, and locking action between two surfaces.

Prior art devices as disclosed in U.S. Pat. No. 4,678,210 to Balsells are directed to holding, latching, and locking devices in which a spring is held in a cavity with the major axis of the coils generally parallel to the center line of the cylindrical surface, and loading occurs generally along the minor axis of the coils.

While these prior art devices are suitable for the engaging and interlocking of lightweight, delicate and many times, fragile, cylindrical parts, there is need for a locking mechanism which allows for a greater degree of tolerance variation between the mating parts. This is particularly true for mechanisms considerably larger than anticipated in the device disclosed in U.S. Pat. No. 4,678,210.

The present invention provides for a locking mechanism which offers a substantially greater degree of reliability and performance than hereinbefore possible in prior art devices. In addition, locking devices in accordance with the present invention offer a substantially greater degree of locking force than the prior art devices utilizing the same size spring. As a result, locking mechanisms in accordance with the present invention may utilize springs made from a smaller wire diameter than heretofore disclosed prior art devices which allow more coils per inch and in addition, greater distribution of the load with greater flexibility.

SUMMARY OF THE INVENTION

A locking mechanism in accordance with the present invention generally includes a garter-type canted-coil spring having elliptical coils with a coil height and a coil width measured, respectively, along a minor and a major axis of the elliptical coils. A first member is provided which includes means defining a first groove for retaining the spring with said first groove having a depth less than the coil width in order that a portion of each coil extends outwardly from the first groove.

A second member is provided including means defining a second groove for accepting the extended portion of each coil and for loading the coils generally along the major axis thereof. When the coils are disposed within and loaded by the first and second grooves, the first and second members are locked to one another. It is important to note that loading of the coils occurs along the major axis thereof and this should be contrasted with the prior art device disclosed in U.S. Pat. No. 4,678,210, in which loading occurs along the minor axis of the coils. Because the coils are loaded along the major axis thereof, a substantially greater degree of force is developed for the same type of spring than when such springs are loaded along the minor axis thereof. Hence, greater locking force can be developed with the mechanism of the present invention which also allows a greater degree of tolerance variation between mating parts than heretofore possible with prior art devices.

In accordance with the present invention, the first groove may be disposed in the circumference of a cylindrical first member or a spherical first member, and the second groove may be disposed in the circumference of a bore of a second member with the latter being sized to accommodate either the cylindrical or spherical first member.

In one embodiment of the present invention, the first groove has a width at most equal to the coil height; and in another embodiment of the present invention, the first groove has a width greater than the coil height.

Further, in accordance with the present invention, a means defining the second groove includes means, defining side walls of the second groove, for determining the force required to unlock the first and second members from one another.

Importantly, the means defining the first groove includes means defining a first groove width for varying an angular disposition of the coil major axis with regard to a first groove center line in order to determine the force required to unlock the first and second members from one another. Further, the means defining the second groove may include side walls which cooperate with the coil orientation to enable the first and second members to be unlocked from one another when moved in one direction with respect to one another and preventing unlocking of the first and second members along an opposite direction.

BRIEF DESCRIPTION OF THE DRAWINGS

A better understanding of the present invention may be had from the consideration of the following detailed description, taken in conjunction with accompanying drawings, in which.

DETAILED DESCRIPTION OF THE DRAWINGS

Figure 1:
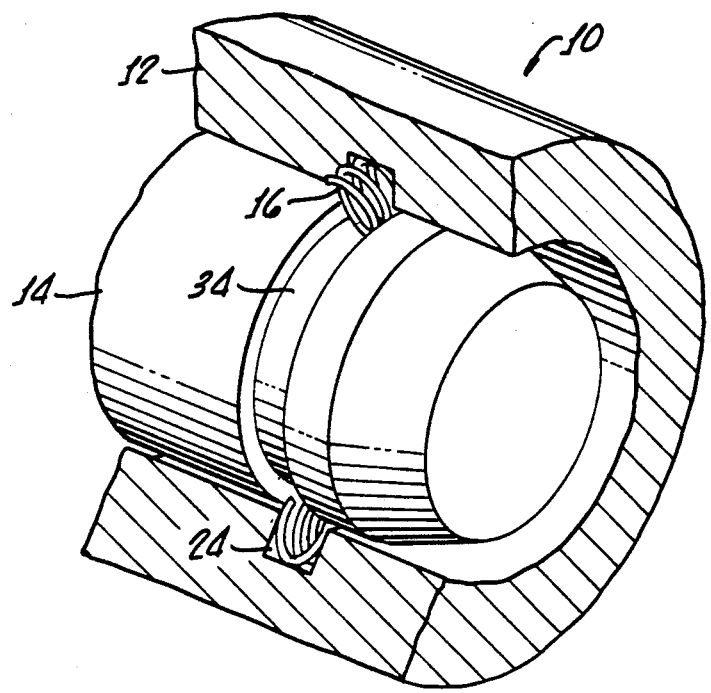
FIG. 1 is a perspective view of the present invention partially broken away, showing a first and second member locked to one another by means of a garter-type canted-coil spring loaded along the major axis thereof.
Figures 2, 3:
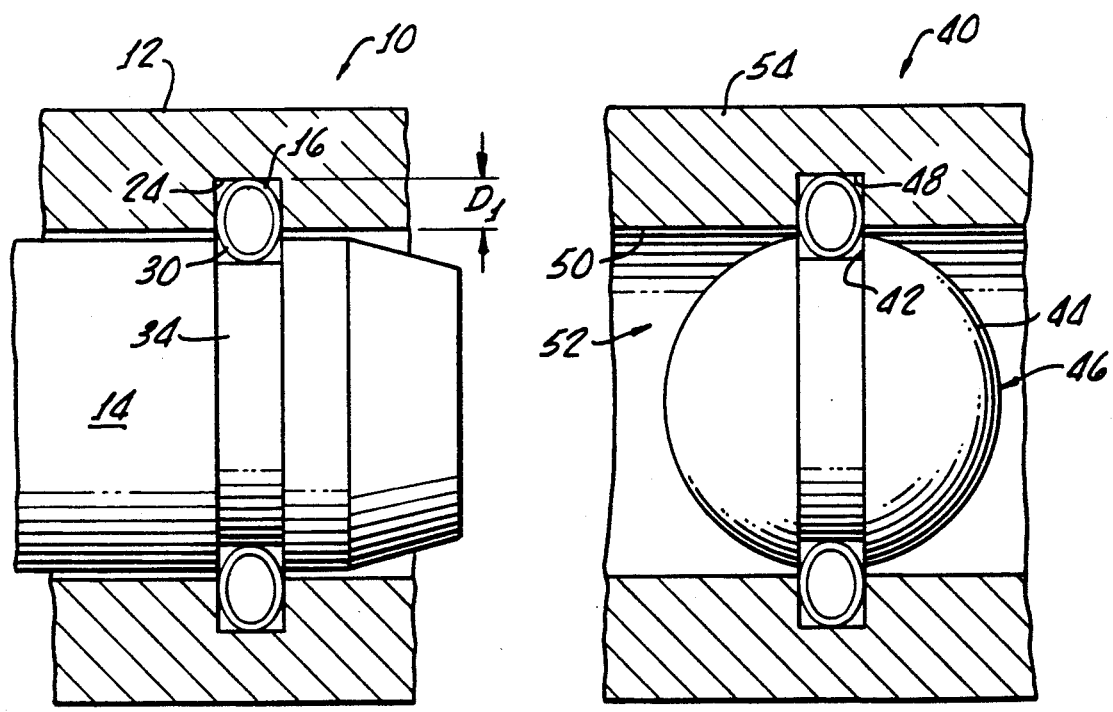
FIG. 2 is a cross-section of the overlocking mechanism shown in FIG. 1.
FIG. 3 is a cross-section view of another embodiment of the present invention showing a spherical first member locked within a second member.
Figure 4A:
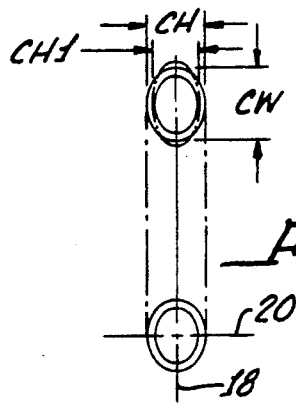
FIGS. 4a and 4b are cross-sectional views of a garter-type canted-coil spring, in accordance with the present invention, having elliptical coils.

Turning now to FIGS. 1 and 2, there is shown a locking mechanism 10 in accordance with the present invention including a first member 12, a second member 14, and a garter-type canted-coil spring 16 having a coil height CH and a coil width CW measured along a major axis 18 and a minor axis 20 (see FIG. 4a). A first groove 24 is disposed in the first member 12 and provides a means for retaining the spring 16. The first groove 24 has a depth D1 less than the coil width CW so that a portion 30 of each coil 16 extends outwardly from the first groove 24. A second groove 34 is provided for accepting the extending portion 30 of the coils 16 and loading of the coils 16 generally along the major axis 18 thereof while the members are locked to one another, as shown in FIGS. 1 and 2, as occurs when the coils 16 are disposed within the first and second grooves 24 and 34.

FIG. 3 shows an alternative embodiment 40 of the present invention in which a first groove 42 is disposed on the circumference 44 of a spherical first member 46 and a second groove 48 is disposed in the circumference 50 of a bore 52 of a second member 54, the bore 52 being sized to accommodate the spherical first member 44. The configuration of this embodiment 40 being identical in all respects to that embodiment 10 shown in FIGS. 1 and 2, except the first member 44 is spherical.

Figure 4B:
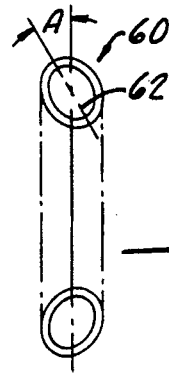

Garter-type canted-coil springs 16, 60 suitable for use in the present invention are shown in crosssection in FIGS. 4a and 4b, respectively. FIG. 4b shows the garter-type canted-coil spring 60 having a major axis oriented at an angle A from the plane of the canted-coil spring 16 which enables preferential locking of the first and second members 12, 14 as will be hereinafter described in greater detail. In FIG. 4a, the solid line represents the coil in a free position and the dashed line represents the coil in an assembled or loaded position, the loaded coil having a corresponding coil height CH1.

Figure 5A:
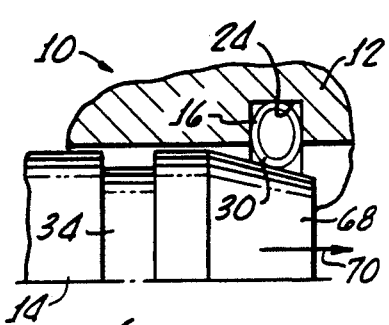
FIGS. 5a, 5b, 5c are diagrammatical view of the spring orientation of the embodiment shown in FIG. 1 during engagement of the first and second members.
Figure 5B:
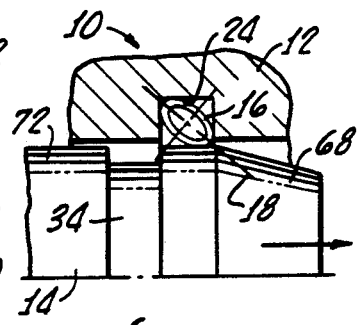
Figure 5C:
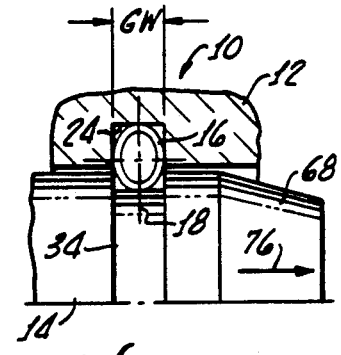

Turning now to FIGS. 5a, b and c, there is shown in diagrammatical form the relationship of the first and second members 12 14 during connect, hold, and locked relationships therebetween. A ramped portion 68 of the second member 14 gradually compresses the spring 16 as the second member is moved in a direction indicated by the arrow 70 while the first member is held stationary. The compressed spring 16 is shown in FIG. 5b in which the surface 72 of the second member compresses the spring 16 within the groove 24 while loading the spring 16 generally along the major axis to hold the first and second members 12 14 to one another. Continued movement of the second member 14 in the direction of arrow 76 causes the first and second members 12 14 to be locked to one another as shown in FIG. 5c, when the coils 16 are disposed within and loaded by the first and second grooves 24 34. In this locked relationship, the loading is generally along the major axis 18 of the groove 16.

Figure 6A:
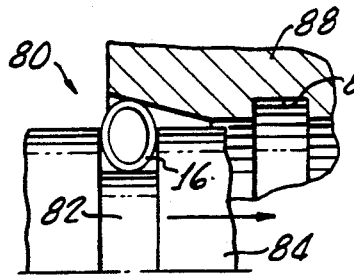
FIGS. 6a, b and c are diagrammatical views similar to those shown in FIG. 5, except that the garter-type canted-coil spring is disposed in a piston for engagement with a housing.
Figure 6B:
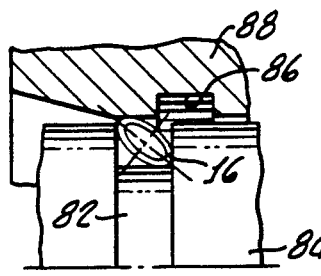
Figure 6C:
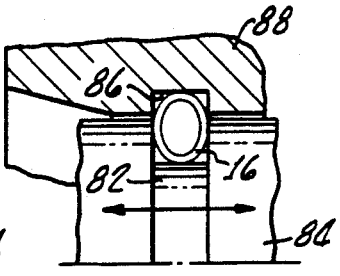

FIGS. 6a, b and c show an alternative embodiment 80 in accordance with the present invention in which the spring 16 is retained in a groove 82 of the piston 84 for engagement with a groove 86 in a housing 88, in a manner similar to that described in connection with FIGS. 5a, b and c.

Figure 7A:
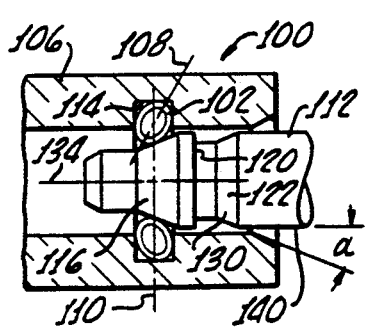
FIGS. 7a, b and c are diagrammatical views of the present invention showing an embodiment in which the piston has a groove having one ramp shoulder cooperating with the spring to enable unlocking of the two members by one direction but preventing unlocking in an opposite direction.
Figure 7B:
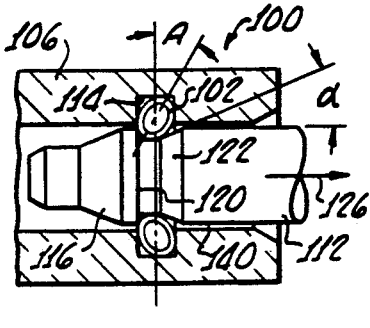
Figure 7C:
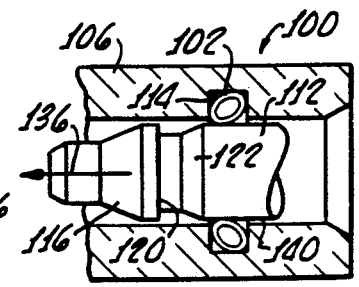

Turning now to FIGS. 7a, b and c, there is shown in another embodiment 100 of the present invention in which the coils 102 are disposed in a groove 114 in a housing 106 with the coils 102 being disposed at an angle A with respect to the plane of the coils 102. By varying the angular disposition of the coil major axis 108 with respect to the plane of the coil 108 and the first groove center line 110, the force required to unlock the first member 106 and second member 112 from one another may be determined. A ramp 116 disposed on the second member 112 is provided for gradually compressing the spring 102 in order to lock the first and second members 106 112 to 30 one another as shown in FIG. 7b. As shown in FIG. 7b, a right angle shoulder 120 of the second member groove 122 prevents unlocking of the first and second members 106 112 from one another when the second member 112 is forced in a direction indicated by the arrow 126. The second member groove 122 includes a ramp shoulder, or side wall, 130 which provides a means for determining, in concert with the first groove 114, the force required to unlock the first and second members from one another. Because the shoulder 130 is at an angle a which falls within the same quadrant defined by the center line of the first groove and an axis 134 of the second member 112, unlocking or disconnecting of the first and second members 106 112 from one another is facilitated when the second member is moved in a direction indicated by the arrow 136 with respect to the first member 106. Upon such movement, the spring 102 is loaded along the major axis 108 by the surface 140 of the second member 112 to hold the first and second members to one another as shown in FIG. 7c.

Figure 8A:
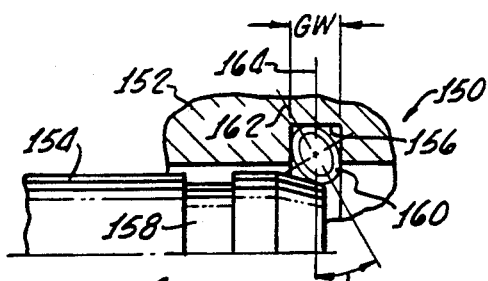
FIGS. 8a, b and c are diagrammatical views of the present invention showing the first and second members having generally rectangular grooves with a spring orientation which enables locking and unlocking of the members in one direction relative to one another and preventing unlocking of the members from one another in and opposite direction.
Figure 8B:
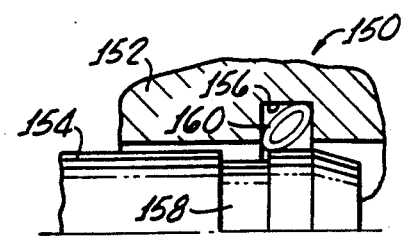
Figure 8C:
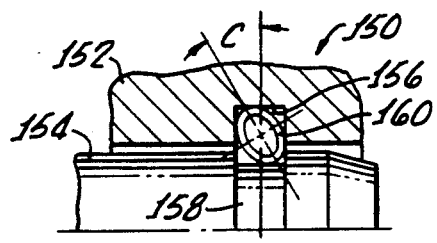

FIGS. 8a, b and c diagrammatically show an alternative embodiment 150 of the present invention, similar to embodiment 10 as shown in FIG. 1, which includes first and second members 152 154, grooves 156 158, which are generally rectangular in shape and spring 160 which has its major axis 162 at an angle A to the center line 164 of the groove 156, the orientation of the spring also being shown in FIG. 4a. By varying angle A, the force required to connect and disconnect the members 152, 154 from one another can be varied. Various groove widths and coil configurations will be discussed in greater detail.

Figure 9:
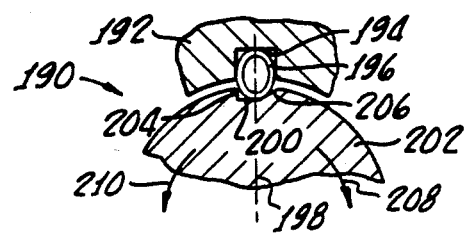
FIG. 9 is a diagrammatical view of another embodiment of the present invention for causing rotation locking of one member to another while enabling the members to rotate in an opposite direction.

In another embodiment 190 of the present invention, as shown diagrammatically in FIG. 9, a first member 192 includes a groove 194 for retaining a spring 196 with the spring 196 being oriented so that it is loaded along a major axis 198 thereof by a groove 200 in a rotatable member 202. The groove includes a right angle shoulder 204 and a ramp shoulder 206 for enabling the rotatable member 202 to be locked against rotation in a direction indicated by the arrow 208 but free to rotate in a direction indicated by the arrow 210. As hereinbefore discussed, the force necessary to unlock or rotate the member 202 is in part determined by the angle of the ramp shoulder 206 and the angular position of the major axis of the spring 196.

Figure 10:
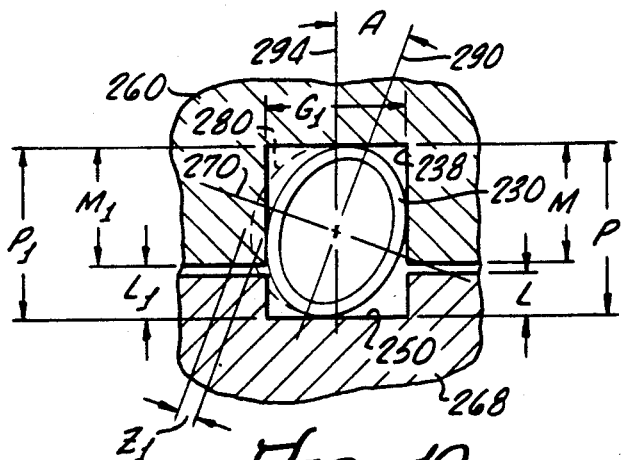
FIGS. 10a, b, c, and d are diagrammatical views of different groove dimensions and spring positions in accordance with the present invention.
Figure 10B:
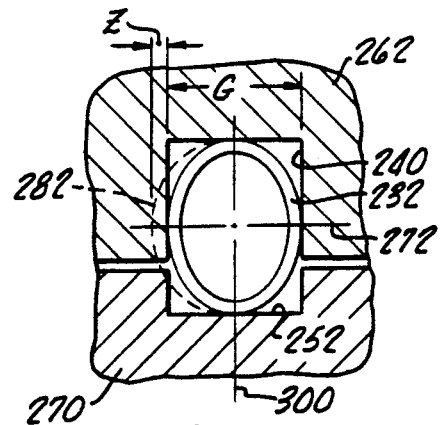
Figure 10C:
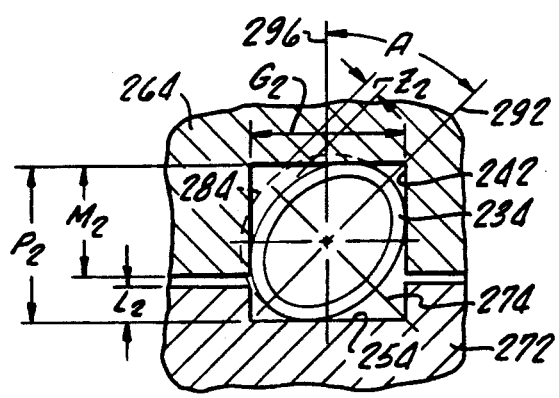
Figure 10D:
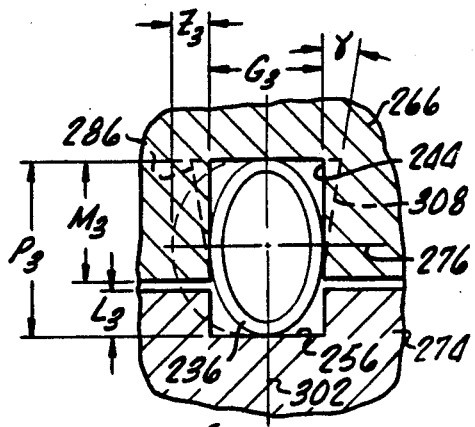

FIGS. 10a, b, c and d are representations of springs 230 232 234 236 in grooves 238 240 242 244, respectively, with the springs 230 232 234 236 oriented for engagement with the grooves 250 252 254 256 for locking members 260 262 264 266 to members 268 270 272 274, respectively. Dashed lines 280 282 284 286 indicate the free or unloaded configuration of springs 230 232 234 236, respectively before their insertion into the grooves 238 240 242 244, respectively. As can be seen in each instance, the grooves 238 240 242 244 load the springs 230 232 234 236 generally along the minor axis 270 272 274 276, respectively, of each spring for retaining the springs within the respective grooves. As shown in FIGS. 10a,-10d, the letters Z, $Z_1$, $Z_2$1, $Z_3$ indicate the amount of deflection of each spring when the spring is assembled into the respective groove. The letters G, $G_1$, $G_2$, $G_3$ indicate the groove width, and the letters P, $P_1$, $P_2$, $P_3$ indicate the combined groove height while the letters M, $M_1$, $M_2$, $M_3$ indicate the groove height retaining portion for the springs 230 232 234 236. The letters L, $L_1$, $L_2$, $L_3$ indicate the groove height latching, holding, locking portion of the groove 250 252 254 256. In terms of the coil height CH measured along the minor axis 270 272 274 276, FIGS. 10A shows the groove width $G_1$ being greater than the coil height CH in an assembled position FIG. 10b shows the groove width G being less than or equal to the coil height CH in an assembled position. FIG. 10c shows the groove width $G_2$ being greater than the coil height CH in an assembled position, and FIG. 10d shows the groove width $G_3$ being less than the coil height CH in an assembled position.

Generally, the greater the angle A, which the major axis 290 292 makes with the plane of the coil spring or first groove center line 294 296, the lower the locking force which needs to be overcome by movement of the first and second members from one another in a specific direction as hereinbefore described. Preferred spring orientation angles A are from about 20° shown in FIG. 10a to about 45° as shown in FIG. 10c. FIGS. 10b and 10d show the springs 232 236 oriented so that loading occurs directly along the major axis 300 302 with the amount of force necessary for locking being determined by the amount of loading by the groove 240 244 of the minor axis 272 276 of the springs 232 236.

To further retain the spring 236 within the groove 244, the groove 244 side walls 308 shown in dotted line in FIGS. 10d may be angled with a clearance angle $\gamma$ which may be greater than 0° and preferably be 0° to 1°

Although there has been described hereinabove a specific locking mechanism according to the present invention for the purpose of illustrating the manner in which the invention may be used to advantage, it should be appreciated that the invention is not limited thereto. Accordingly, any and all modifications, variations, or equivalent arrangements, which may occur to those skilled in the art, are to be considered to be within the scope of the invention as defined in the appended claims.

What is claimed is:

1. Locking mechanism comprising:
a garter-type canted-coil spring having elliptical coils with a coil height and a coil with measured, respectively, along a minor and a major axis of the elliptical coils;
a first member including means defining a first groove for retaining the spring, said first groove having a depth less than the coil width in order that a portion of each coil extends outwardly from the first groove;
a second member including means defining a second groove for accepting the extended portion of each coil and for loading the coils generally along the major axis thereof, said first and second members being locked to one another when the coils are disposed within and loaded by the first and second grooves.

2. The locking mechanism according to claim 1 wherein said first groove is disposed in the circumference of a cylindrical first member and said second groove is disposed in the circumference of a bore in said second member, said bore being sized to accommodate the cylindrical first member.

3. The locking mechanism according to claim 1 wherein said first groove is disposed in the circumference of a spherical first member and said second groove is disposed in the circumference of a bore in a second member, said bore being sized to accommodate the spherical first member.

4. The locking mechanism according to claim 1 wherein the first groove has a width at most equal to the coil height.

5. The locking mechanism according to claim 1 wherein the first groove has a width greater than the coil height.

6. The locking mechanism according to claim 4 wherein said means defining a second groove includes means, defining side walls of the second groove, for determining the force required too unlock the first and second members from one another.

7. The locking mechanism according to claim 5 wherein said means defining a second groove includes means, defining side walls of the second groove, for determining the force required to unlock the first and second members from one another.

8. The locking mechanism according to claim 5 wherein said means defining a first groove includes means, defining tapered side walls of the first groove, for retaining the spring in said first groove.

9. The locking mechanism according to claim 1 wherein said means defining a first groove includes means, defining a first groove width, for varying an angular disposition of the coil major axis with respect to a first groove center line in order to determine the force required to unlock the first and second members from one another.

10. The locking mechanism according to claim 9 wherein said means defining a second groove includes means, defining side walls of the second groove, for determining, in concert with said means defining a first groove width, the force required to unlock the first and second members from one another.

11. Locking mechanism comprising:
a garter-type canted-coil spring having elliptical coils with a coil height and a coil width measured, respectively, along a minor and a major axis of the elliptical coils;
a first member including a surface having means, defining a first groove, for retaining the spring, and orienting the coils so that the coil major axis is disposed at an acute angle with a normal to the first member surface, said first groove having a depth less than the coil width in order that a portion of each coil extends outwardly from said first groove; and
a second member including means defining a second groove for accepting the extended portion of each coil and for loading the coils generally along the major axis thereof and cooperating with the coil orientation to enable the first and second members to be unlocked from one another when moved in one direction with respect to one another and preventing unlocking of the first and second members along an opposite direction.

12. The locking mechanism according to claim 11 wherein said first groove is disposed in the circumference of a cylindrical first member and said second groove is disposed in the circumference of a bore in said second member, said bore being sized to accommodate the cylindrical first member.

13. The locking mechanism according to claim 11 wherein said first groove is disposed in the circumference of a spherical first member and said second groove is disposed in the circumference of a bore in a second member, said bore being sized to accommodate the spherical first member.

14. The locking mechanism according to claim 11 wherein the first groove has a width greater than the coil height.

15. The locking mechanism according to claim 14 wherein said means defining a second groove includes means, defining side walls of the second groove, for determining the force required to unlock the first and second members from one another.

16. The locking mechanism according to claim 14 wherein said means defining a first groove includes means, defining tapered side walls of the first groove, for retaining the spring in said first groove.

17. The locking mechanism according to claim 11 wherein said means defining a first groove includes means, defining a first groove width, for varying the acute angle in order to determine the force required to unlock the first and second members from one another.

18. The locking mechanism according to claim 12 wherein said means defining a second groove includes means, defining side walls of the second groove, for determining, in concert with said means defining a first groove width, the force required to unlock the first and second members from one another.

* * * * *